US 8,004,551 B2

(12) United States Patent
Atwood et al.

(10) Patent No.: US 8,004,551 B2
(45) Date of Patent: *Aug. 23, 2011

(54) ROS DESKEW MECHANISM

(75) Inventors: Mark A Atwood, Honeoye Falls, NY (US); Joseph M Wing, Ontario, NY (US); Brian J Perry, Bloomfield, NY (US); James P Calamita, Spencerport, NY (US); Thomas R Race, Rochester, NY (US); Alan G Schlageter, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 770 days.

This patent is subject to a terminal disclaimer.

(21) Appl. No.: 12/053,753

(22) Filed: Mar. 24, 2008

(65) Prior Publication Data

US 2009/0237746 A1 Sep. 24, 2009

(51) Int. Cl.
*B41J 15/14* (2006.01)
*B41J 27/00* (2006.01)

(52) U.S. Cl. ......................................... 347/242; 347/257

(58) Field of Classification Search .................. 347/263, 347/230, 241–245, 256–258
See application file for complete search history.

(56) References Cited

U.S. PATENT DOCUMENTS

| 4,912,491 | A | * | 3/1990 | Hoshino et al. | 347/116 |
| 5,633,744 | A | * | 5/1997 | Nakajima | 359/196.1 |
| 6,600,504 | B2 | * | 7/2003 | Okugawa et al. | 347/152 |
| 7,262,787 | B2 | * | 8/2007 | Park | 347/263 |
| 7,760,226 | B2 | * | 7/2010 | Atwood et al. | 347/242 |

* cited by examiner

*Primary Examiner* — Hai C Pham
(74) *Attorney, Agent, or Firm* — Ellis B. Ramirez; Prass LLP

(57) ABSTRACT

In a color marking assembly, a series of ROS units are aligned above a photoconductive surface. These units have inboard and outboard mounts connecting them to this assembly. The inboard mounts are attached to a first side of the ROS, and the outboard mounts are attached to a second side of the ROS unit. The inboard mount is an elongated bar extending beyond the height of the ROS unit. This elongated bar has hinged portions on both its top and bottom connections to the ROS unit. The outboard mount has a ball bearing or sphere configuration. This configuration and the inboard mount enable the ROS unit to be easily deskewed when required.

7 Claims, 7 Drawing Sheets

ROS DESKEW MECHANISM

CROSS REFERENCE

Illustrated and disclosed in a application "ROS Deskew Mechanism with linear actuator ", U.S. application Ser. No. 12/053704 (Now U.S. Pat. No. 7,760,226), filed on Mar. 24, 2008, by Mark A. Atwood et al. owned by the present assignee is an application relating to ROS deskew mechanism with a linear motor and mechanism. The U.S. patent application based upon U.S. application Ser. No. 12/053704, filed on Mar. 24, 2008, by Mark A. Atwood et al. is filed in the US Patent and Trademark Office on the same date as the present application which is based upon The disclosure of U.S. application Ser. No. 12/053704, filed on Mar. 24/2008, by Mark A. Atwood et al. is totally incorporated herein by reference.

This invention relates to an electrophotographic color system and more specifically for a movement used in these systems to improve color image registration.

BACKGROUND

In one color system, an array or series of different color imaging stations are aligned above an endless belt. Each imaging station contains a raster output scanner (ROS), photoreceptor drum, development station, and cleaning station. The ROS emits an electronic beam (laser) which impinges on the rotating photoconductive drum, thereby causing that location on the drum to undergo a change in electrical charge. As the drum continues to rotate past the development station, toner particles of a color which is unique to that imaging station will attach to the drum at the location charged by the ROS. This colored image is then transferred to an intermediate transfer belt that is passing by, and in contact with, the photoreceptor drum. As the intermediate belt passes by the different imaging stations (each usually containing a different color) it picks up subsequent color layers to create a complete color image which is then transferred to media.

Each colored beam must be in substantial registration with the other beams deposited on the belt for a final color copy. If any color needs to be re-aligned or skewed, the ROS unit is moved accordingly. In one embodiment there are also two sensors (Mark On Belt, or MOB sensors) that are fixed in position to a point on the machine frame, such that the colored images pass within view of these sensors. These sensors serve to detect the misregistration or misalignment between colors. The actuation of the deskew portion of the correction is performed via a ROS mechanism such as in of this invention. Each ROS unit has its own motor so that it could independently be skewed for image alignment. This type of color system having an array of ROS units is generally described in U.S. Pat. No. 6,418,286 and is incorporated by reference into this disclosure. As noted above, the color image deposited on the drum is subsequently deposited onto the belt. As the drum continues to rotate, it passes through the development station with a latent image which causes toner to stick to the drum where the electrical discharging (by the ROS) has taken place. The drum further rotates until the image is in contact with this intermediate transfer belt where the image is transferred from the drum to the belt. Each of the six or plurality of imaging stations deposits its own color and subsequently movement of the belt is moved past each of the imaging stations and allows each of the color separations to be deposited in turn. Thus, when the colors are out of alignment, the image needs to be skewed as does the image beam. By placing registration images side by side on the intermediate belt, the MOB sensors will indicate how much each ROS needs to be skewed to provide the optimum color-to-color registration deposited on the belt by the six or several ROS units.

One of the problems encountered is that the prior art mountings of the ROS are not robust to vibration sources within the imaging system, thereby causing "banding". These prior art mountings are susceptible to vertical vibration which generally causes imprecise image deposition. By "banding" is meant a series of dark and light image lines causing image quality defects or color variations. The present invention involves an improved ROS mounting and skew adjustment mechanism. In typical prior art ROS mounting—the spheres and arms are located in the bottom portion of the ROS in line with the focal point of the ROS beam.

As noted above, generally, these prior art ROS mountings are positioned at the bottom lower end of the ROS, usually in the form of arms, one on each lower side of the ROS. Each arm is adjacent to a mounting sphere, which lie along the focal point axis. This allows the ROS to pivot about the focal axis without affecting focus itself. Reuse of this prior art configuration, especially in more compact future systems requires a need to locate the mounting spheres off axis. This presents a problem of how to mount the ROS such that it isn't overconstrained and has the degree of freedom needed to permit proper deskewings of the beam when necessary. For image registration purposes, the ROS beam needs to be deskewed in order to align its image with the image of the other colors being written on the belt.

SUMMARY OF THE INVENTION

Generally, the prior arm and sphere mountings located below the ROS unit are removed and replaced with the mountings of the present invention where the spheres are located away from this focal point. Rather than locate the mountings below the ROS units, mountings of the present invention are placed on each side of the ROS, an inboard mount and an outboard mount. The present mounting hardware permits this while rigidly holding the ROS but not over-constraining it. Two degrees of freedom still exist; one to allow deskewing of the ROS beam and the other to compensate for part-part variation. The robustness of the design of the present invention will limit image defects due to vibration. The inboard mount comprises a vertical bar connected to the top and bottom of the inboard side of the ROS. Each connection is in the form of a hinge where the ROS essentially pivots like a door on two hinges as it is deskewed.

Present configuration—Because of hardware space constraints, the prior art arms that held the sphere need to be removed and the mounting spheres located away from the focal point of the ROS. The mounting hardware allows the present invention to do this while rigidly holding the ROS but not over-constraining it.

On the outboard side, a mounting is used where a ball bearing rides on a surface located near the lower outboard portion of the ROS. On the lower inboard side, a mounting is used where a sphere is located in a conical feature. The outboard bearing and the inboard sphere are positioned such that the focal plane of the ROS is in contact with the photoreceptor surface. Additional parts on the outboard side mounting are used to securely support the ROS and to allow deskewing of the beam when required.

The upper inboard mount is mounted such that it is not over constrained, while still maintaining proper orientation of the entire ROS.

DETAILED DISCUSSION OF DRAWINGS AND PREFERRED EMBODIMENTS

Figure 1:
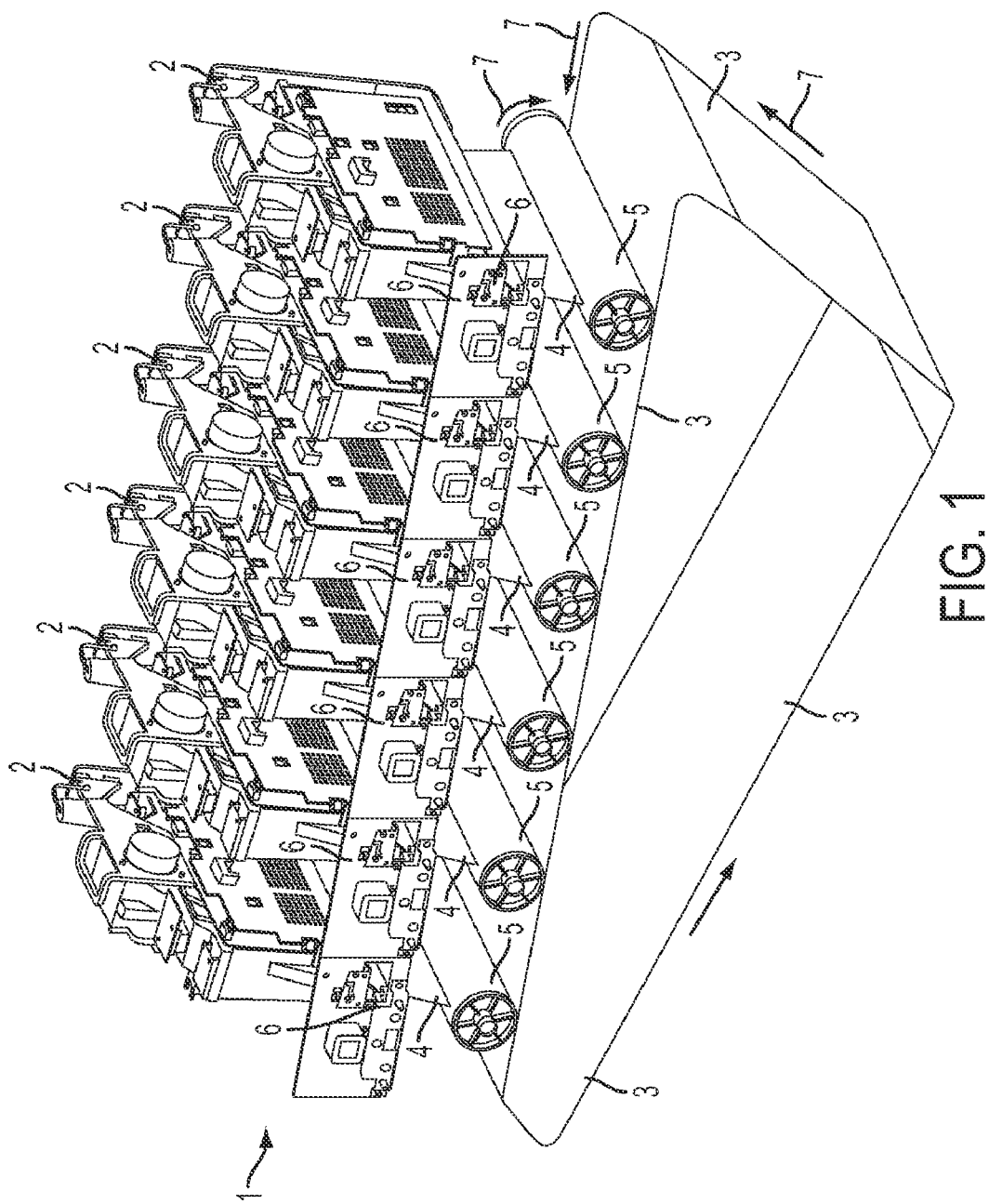
FIG. 1 is an isometric view of a 6-station intermediate belt transfer xerographic system where the ROS mounts of the present invention can be used.

In FIG. 1, a color imaging system 1 is illustrated having an array of raster output scanners (ROS) 2 and their associated photoreceptor drums 5 aligned above an endless intermediate transfer belt 3. Each ROS emits a different image beam 4 on a photoconductive drum 5 to charge the drum's surface where the image for that color will be located. As the drum 5 rotates, the charged regions pick up toner of the color for that particular imaging station and transfer this color image to the surface of the belt 3 so that each colored image is deposited in relation to the previous deposited image. At the end of the process, all six deposited images (that are color developed at each station) are precisely aligned to form the final color image which is eventually transferred to media. The arrows 7 indicate the rotation direction of drum 5 and belt 3.

A typical xerographic imaging system useful in the present invention and employing ROS units, as above described, is disclosed in U.S. Pat. No. 6,418,286B1. This patent disclosure is incorporated by reference into the present disclosure.

It is in the above type xerographic imaging systems that the novel ROS mountings of this invention are used. The present mountings permit secure deskewing operation while at the same time eliminating the disadvantages of the mounting of the prior art as shown in FIG. 2.

Figure 2:
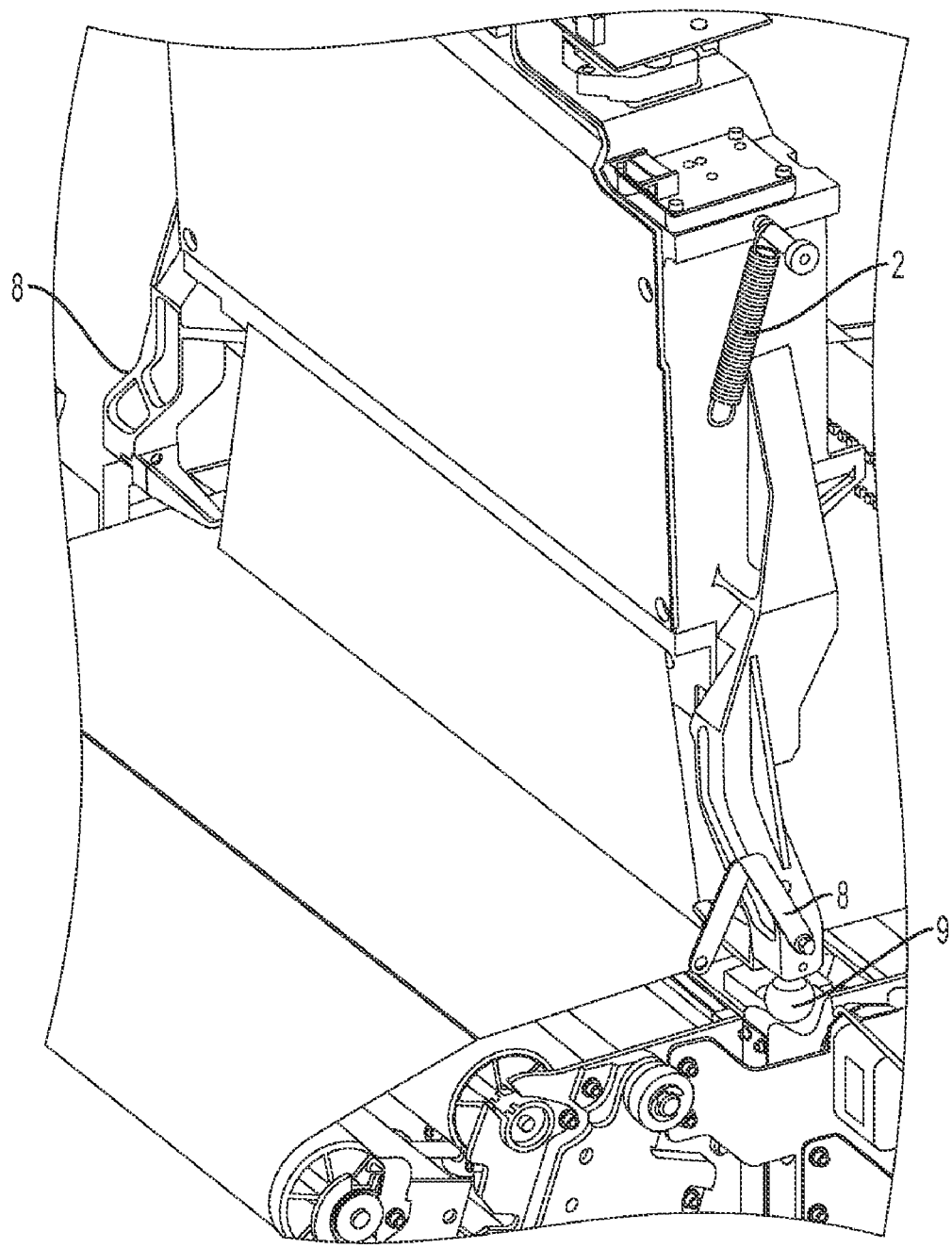
FIG. 2 is a ROS mounting used in the prior art comprising generally arms attached to the bottom portion of the ROS unit.

In FIG. 2, the ROS units 2 have at their bottom portion mounting arms 8 with spheres 9 for ROS location and deskewing. As noted above, this type ROS mounting encountered vibration problems that caused banding as discussed earlier. Since precise image registration is necessary in this type system, a new and improved ROS mounting was found essential. As shown in FIG. 2, substantially the same ROS unit 2 can be used with arms 8 removed and spheres 9 relocated relative to the focal plane of the ROS beam.

Figure 3A:
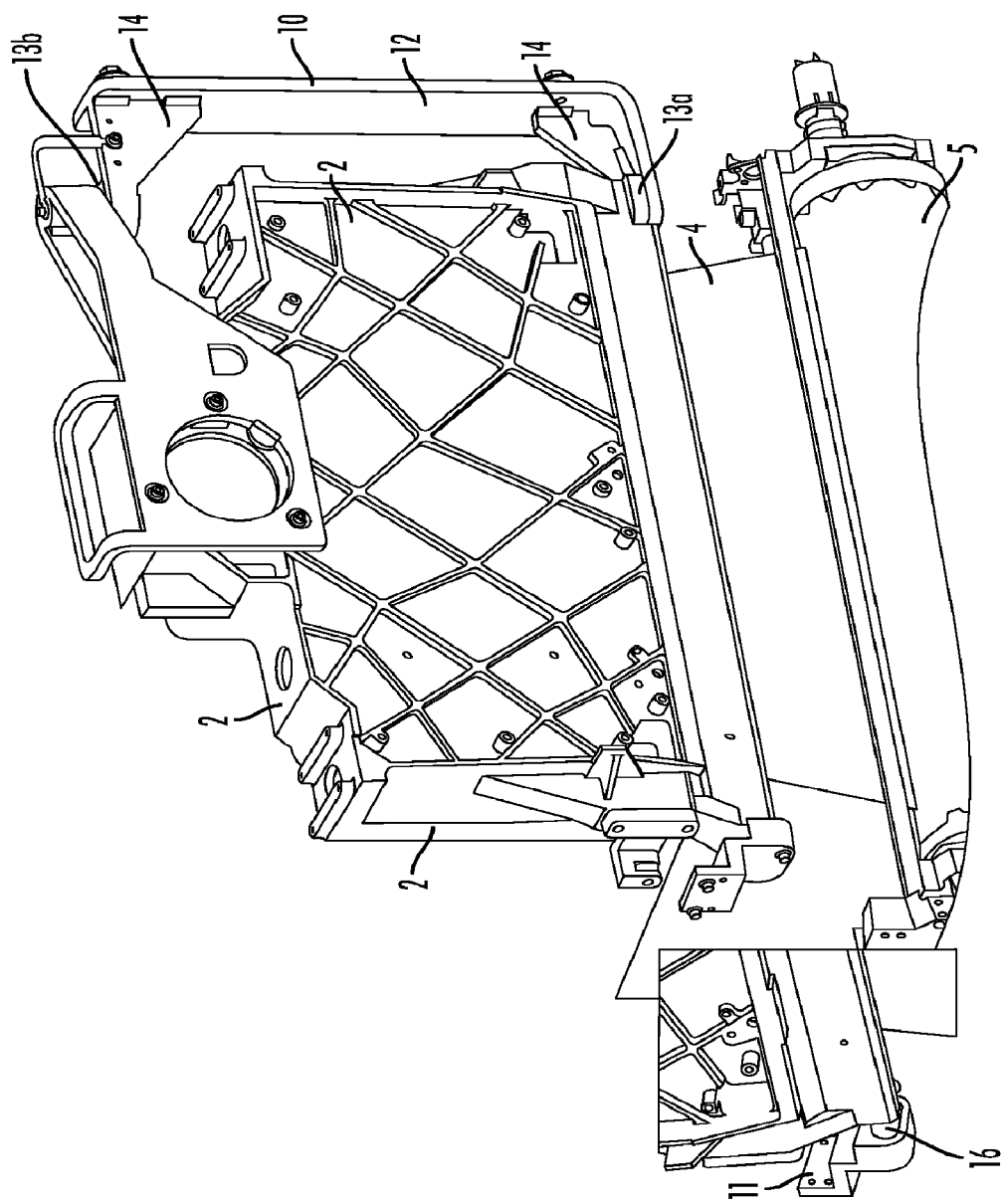
FIG. 3A is an embodiment of the ROS mounting unit of the present invention having the bottom prior art mounting arms removed and side inboard and outboard mountings substituted therefore.

In FIG. 3A, an embodiment of the side mountings of the present invention are illustrated. On one side, (the inboard side) is located the inboard mounting 10 and on the opposite side is located an outboard mounting 11. The inboard mounting 10 comprises an elongated bar 12 that extends vertically beyond the height of ROS 2. At each end of bar 12 are pivots 13a and 13b which permit the ROS 2 to be moved easily when deskewing occurs, similar to the hinges on a door. The lower pivot 13a is constrained in x, y and z translation directions and the upper inboard pivot 13b is constrained such that when the outboard mount is in place, 13b constrains rotation of the ROS units about the z-axis, but is free to move in the other axes as part tolerances require. This inboard mounting is free from obstructing the beam 4 when deskewing and imaging while securely fixing the ROS 2 in place. On each end of bar 12 are gussets 14 attached to the bar 12 to decrease deflections that would allow ROS to move.

Figure 3B:
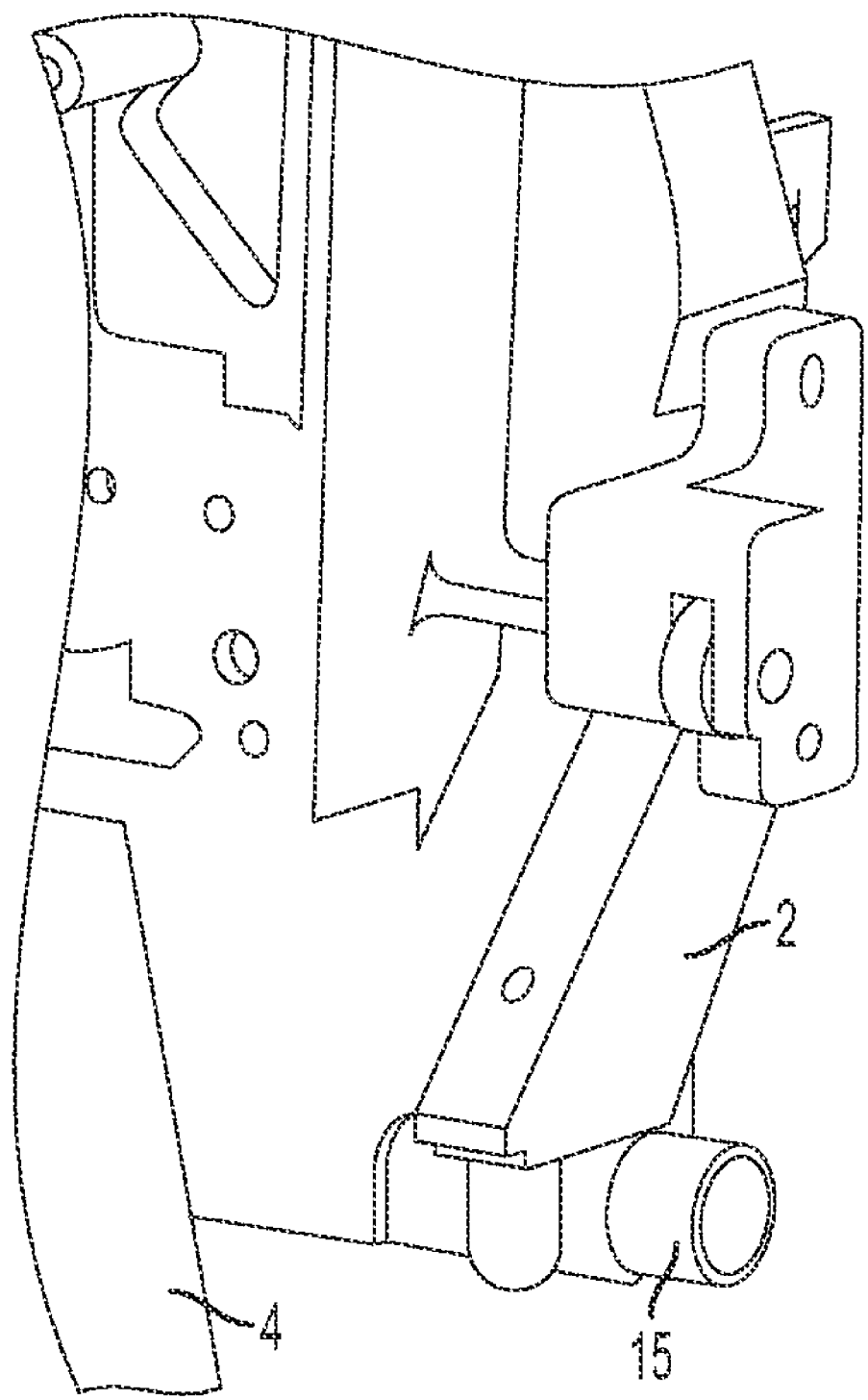
FIG. 3B illustrates the bearing used in the outboard mounting.

On the outboard mounting, partially shown in FIG. 3B in an exploded view, a ball bearing 15 is positioned at the bottom outboard corner of ROS unit 2. The ball bearing 15 rides in a block 16 so that the ROS is easily movable therein. The ball bearing is attached to the outboard corner of the ROS 2 while mating block 16 is located in a side structure adjacent to ROS 2. Any suitably movable outboard structure can be used in place of the ball bearing block configuration, if desired.

Figure 4A:
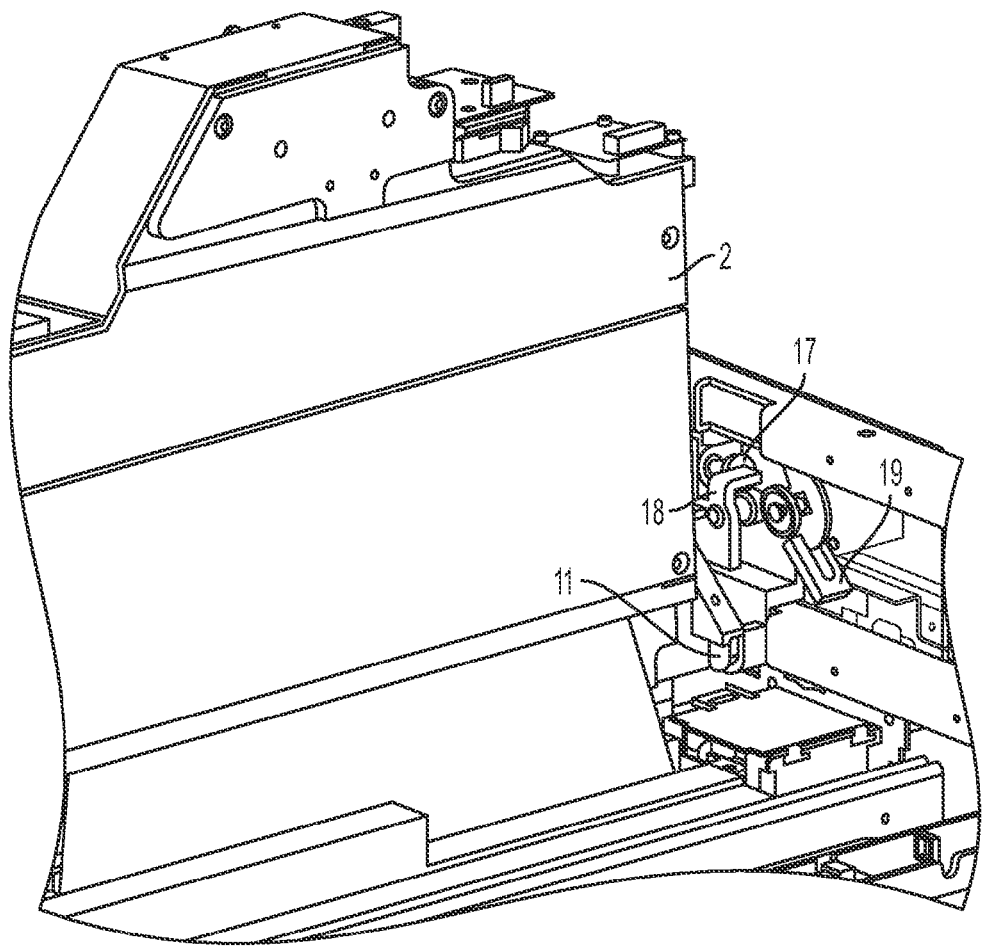
FIG. 4A illustrates an embodiment of the outboard ROS mounting of the present invention.
Figure 4B:
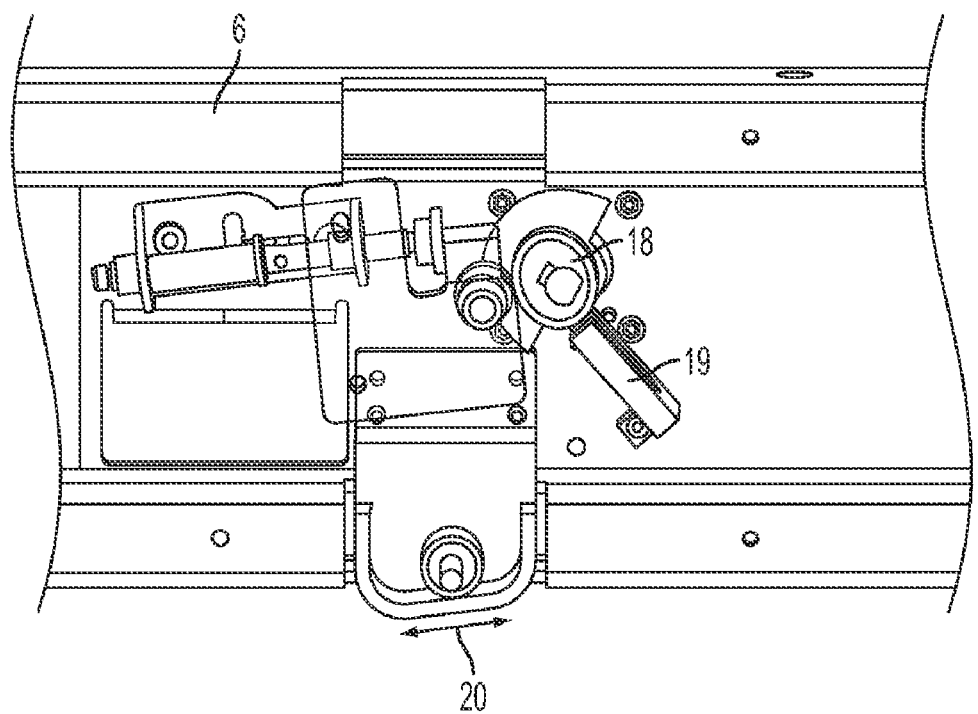
FIG. 4B shows the specifics of the outboard mounting together with a deskew travel item and a home sensor.

In FIG. 4A, the outboard mounting 11 is shown in place in ROS 2, i.e. ball bearing 15 in mating block 16. Adjacent to outboard mounting 11 is a ROS bias force 17, a deskew cam 18 and a home sensor 19. The arrow 20 indicates the direction of deskew travel. The ROS bias force 17 operates to remove backlash from the motion of the ROS by biasing it against the cam. The deskew cam 18 operates to move the outboard end of the ROS (via a stepper motor attached to the cam), thereby providing the deskew motion and the sensor 19 is used by the deskew controller to locate the starting or "home" position of the cam and stepper motor.

Figure 5A:
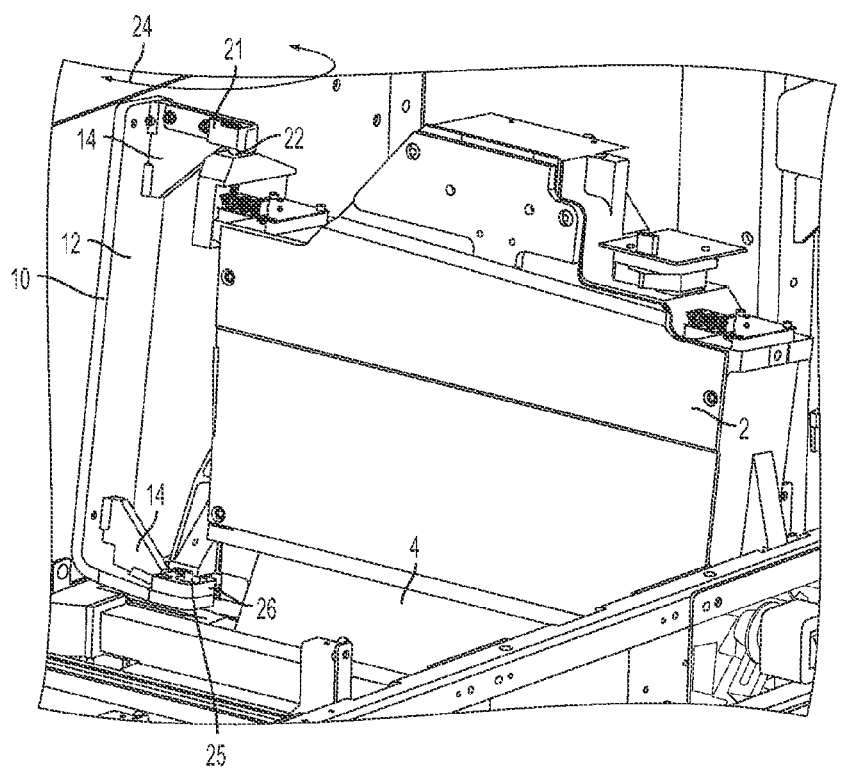
FIG. 5A shows an inboard mounting of the present invention as it is attached to the ROS unit.
Figure 5B:
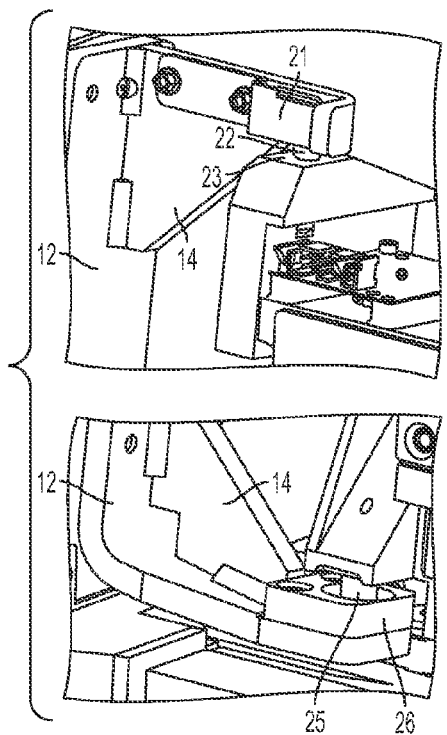
FIG. 5B shows specifics of this inboard mounting, both at its top and bottom sections.

In FIGS. 5A and 5B, specifics of inboard mounting 10 are illustrated. At the top gusset 14 is located a spring retainer 21 which clamps the movable ball 22 in place on flat surface 23. The arrow 24 shows the movement of the ROS 2 on inboard mounting 10 via inboard upper mounting sphere 22. At the bottom of inboard mounting 10 is located a sphere 25 which rests in a socket 26 and acts as a pivot and locating feature for ROS 2 when deskewing. Thus, in one embodiment, inboard mounting 10 has a bar 12 with sphere 22 (top) and sphere 25 (bottom) of bar 12. This new mounting with inboard mount 10 and outboard mount 11 allows the ROS 2 to be easily deskewed relative to the photoreceptor or photoconductors with the advantage of overcoming structural resonance in the 60-90 Hz range exhibited when the system 1 is operational.

The invention provides a bracket with a sphere 22 attached to it and is added to the top of the casting to create an additional pivot point which is in line with the lower inboard sphere. This establishes an axis which is perpendicular to the plane of motion created by the outboard ball bearing and the inboard lower pivot point. When the spheres are mounted, this axis becomes a hinge point to deskew the ROS about. Additional parts on the OB side of the ROS are needed to rigidly support it and to allow deskewing of the beam. The ROS essentially pivots like a door on two hinges as it is deskewed.

In summary, this invention provides a raster output scanner (ROS) unit comprising an image beam emitting ROS unit, an inboard mount attached to a first side of the ROS unit, an outboard mount attached to a second side of the ROS unit. Both the inboard mount and the outboard mount are positioned so that they will not interfere with a beam emitted from the ROS unit. The inboard mount comprises an elongated bar extending away from and beyond a height of the ROS unit. The bar has hinged portions on both its upper and lower terminal portions or ends and each is pivotally mounted on the ROS unit. The outboard mount comprises a sphere or ball bearing and locating block configuration. This configuration and the inboard mount are enabled to enable the ROS unit and its ROS beam to be easily deskewed when required.

In the ROS unit, the inboard mount has a sphere-socket configuration on the lower terminal portion and a sphere-surface configuration on the upper terminal portion. The inboard mount has a spring retainer on the upper terminal portion. This retainer is enabled to capture the sphere in place and is enabled to permit free pivoting of the ROS unit when deskewing.

In one embodiment, the inboard mount comprises an elongated bar extending at the first side of the ROS unit and beyond a height of the ROS unit. The bar is connected to the ROS unit at both the upper and lower terminal portions at a top and bottom side portion of the ROS unit. The bar comprises a spring retainer and inboard upper mounting sphere-surface-spring retainer configuration at a top ROS connection. The bar comprises at its bottom side portion an inboard lower mounting sphere housed in a socket.

The inboard mount is enabled to minimize the effects of vibration within the electrophotographic marking system and thereby is enabled to improve the quality of an image from the ROS unit. As noted, the inboard mount has a spring retainer on its upper portion. This retainer is enabled to hold an inboard upper mounting sphere movably in place and is enabled to permit free pivoting of the ROS unit during a deskewing operation.

Generally, the beam-emitting ROS marking unit of this invention is useful in a Xerographic marking assembly. It comprises at least two mounts which are enabled to secure the ROS unit to a Xerographic station of the marking assembly. A first of these mounts is an inboard mount extending at the side of the ROS unit and extending beyond a height of the ROS unit.

A second outboard mount movably is positioned in a bottom portion of the unit and provides a pivot point for the unit. The inboard mount comprises an elongated bar having hinges at both of its upper and lower sections. The hinges are movably attached to the unit and the unit is enabled to emit an electronic imaging beam at a location between the two mounts. The inboard mount is enabled to substantially reduce any adverse vibration effects on the beam during an imaging and marking process.

The marking assembly further comprises an endless photoconductive belt in operative arrangement with a photoconductive drum. The drum is enabled to be in operative contact with the electronic beam and is adapted to receive the beam in a latent image configuration. The marking assembly has a development system enabled with the drum to develop this latent image and transfer this developed image to the endless photoconductive belt. The marking assembly has a plurality of these marking units and they are aligned along the photoconductor belt. Each of the units is enabled to develop the latent image in a different color than the other of the aligned units.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A raster output scanner (ROS) unit comprising:
   an image beam emitting ROS unit;
   an inboard mount attached to a first side of the ROS unit;
   an outboard mount attached to a second side of said ROS unit;
   both said inboard mount and said outboard mount being positioned so that they will not interfere with a beam emitted from said ROS unit;
   said inboard mount comprising an elongated bar extending away from and beyond a height of said ROS unit;
   said bar having hinged portions on both its upper and lower terminal portions or ends and each pivotally mounted on said ROS unit;
   said bar being connected to said ROS unit at both said upper and lower terminal portions at a top and bottom side portion of said ROS unit, said bar comprising a spring retainer and inboard upper mounting sphere-surface-spring retainer configuration at a top ROS connection;
   wherein said bar comprises at its bottom side portion an inboard lower mounting sphere housed in a socket;
   said outboard mount comprising a sphere or ball bearing and locating block configuration, said configuration and said inboard mount enabled to enable said ROS unit and its ROS beam to be easily deskewed when required.

2. The raster output scanner (ROS) unit of claim 1 wherein said inboard mount is enabled to minimize the effects of vibration within said electrophotographic marking system and thereby enabled to improve a quality of an image from said ROS unit.

3. A beam emitting ROS unit for use in a xerographic marking assembly or system comprising:
   at least two mounts enabled to secure said ROS unit to a xerographic station in said marking system;
   a first of said mounts being an upper inboard mount extending at the side of said ROS unit and extending beyond a height of said ROS unit;
   a lower inboard mount positioned in a bottom portion of said unit and providing a pivot axis for said unit; and
   a second outboard mount comprising a sphere or ball bearing positioned on a ball bearing block, said mounts enabled to substantially reduce any adverse vibration effect on said beam during an imaging and marking process;
   wherein said inboard mount comprises:
   an elongated bar extending at a side of said unit and beyond a height of said ROS unit, said bar being connected to said ROS unit at both a top connection and bottom side portion and connection of said ROS unit, said bar comprising a spring retainer and inboard upper mounting sphere-surface-spring retainer configuration at said top connection; and
   comprising at its bottom side portion an inboard lower mounting sphere housed in a socket, said socket attached to said elongated bar unit.

4. The beam emitting ROS unit of claim 3 wherein said inboard mount is enabled to minimize vibration from an electrophotographic marking system and thereby enabled to improve a quality of an image from said ROS unit.

5. A beam emitting ROS marking unit useful in a Xerographic marking assembly comprising:
   at least two mounts enabled to secure said ROS unit to a xerographic station of said marking assembly;
   a first of said mounts being an inboard mount extending at the side of an ROS unit and extending beyond a height of said ROS unit;
   a second outboard mount movably positioned in a bottom portion of said unit and providing a pivot point for said unit;
   said inboard mount comprising an elongated bar having hinges at both its upper and lower sections, said hinges movably attached to said unit;
   said unit enabled to emit an electronic imaging beam at a location between said two mounts;
   said inboard mount enabled to substantially reduce any adverse vibration effects on said beam during an imaging and marking process; and
   said assembly further comprising an endless photoconductive belt and having a photoconductive drum enabled to be in operative contact with said electronic beam and configured to receive said beam in a latent image configuration, said assembly having a development system enabled to develop said latent image and transfer this developed image to said endless photoconductive belt;

wherein said inboard mount comprises:

said bar being connected to said ROS unit at both a top connection and bottom side portion of said ROS unit, said bar comprising a spring retainer and mounting sphere-track configuration at said top connection; and said bar comprising at its bottom side portion a mounting sphere housed in a socket, said socket attached to said ROS unit.

6. The beam emitting ROS marking unit of claim 5 wherein a plurality of said marking units are aligned along said photoconductor, each of said units enabled to develop said latent image in a different color than the other of said aligned units.

7. The beam emitting ROS marking unit of claim 5 wherein said inboard mount is enabled to minimize vibration from an electrophotographic or said xerographic marking system and thereby enabled to improve a quality of an image from said ROS unit.

* * * * *